Aug. 30, 1966 W. FAHLAND 3,269,022
FINE MEASURING INSTRUMENT WITH A MEASURING EYEPIECE
Filed April 24, 1963 2 Sheets-Sheet 1

Inventor:
Willy Fahland
By

# United States Patent Office 3,269,022
Patented August 30, 1966

3,269,022
FINE MEASURING INSTRUMENT WITH A MEASURING EYEPIECE
Willy Fahland, Glinde, Hamburg, Germany, assignor to J. D. Möller Optische Werke G.m.b.H., Wedel, Holstein, Germany
Filed Apr. 24, 1963, Ser. No. 275,450
Claims priority, application Germany, Apr. 27, 1962, M 52,650
2 Claims. (Cl. 33—180)

For fine measurement of lengths or angles measuring eyepieces and other optical measuring instruments are known which make it possible to read off the measured values directly. It is also known to make fine measurements by means of electrical devices, for example by the displacement of capacitor plates.

The invention relates to an optical fine measuring instrument, by which a direct electrical indication of the optically determined measurement values is made possible. For this purpose, in accordance with the invention, the translation members for moving the measuring line or measuring plate are connected with a potentiometer or with its slider, and a voltage, changing proportionately with the movement of the measuring line, is transmitted to a suitably calibrated indicating device.

The potentiometer may take the form of a stationary ring potentiometer arranged about the shank of the adjusting screw of a micrometer of a measuring eyepiece, and sliding on this a slider placed in the measuring circuit and which may be rigidly connected with the micrometer screw. The displacement of the measuring line perpendicular to the direction of the same is reversed in voltage value by means of slider and ring potentiometer through the angle of rotation of the setting screw proportional thereto; the slider can also be arranged to slide on a potentiometer arranged parallel to the inclined plane of displacement of the graduated dial and the slider itself be rigidly connected with the graduated dial.

When applied to a coil micrometer the arrangement is such that the graduated plate, rotatable in a horizontal plane and provided with a measuring coil, on a coil micrometer, is surrounded concentrically by by a ring potentiometer, whose slider transmits the voltage proportionately to the angle of rotation to the indicating device.

The indicating device showing the voltages is preferably variable in position and made separate from the micrometer. Calibrated scales, optical or acoustical signals, terminal switches, photo-cells, recording scribers or the like can be used for the indications.

Specific embodiments of the invention will now be described by way of example with reference to the accompanying drawings, in which.

Figure 1:
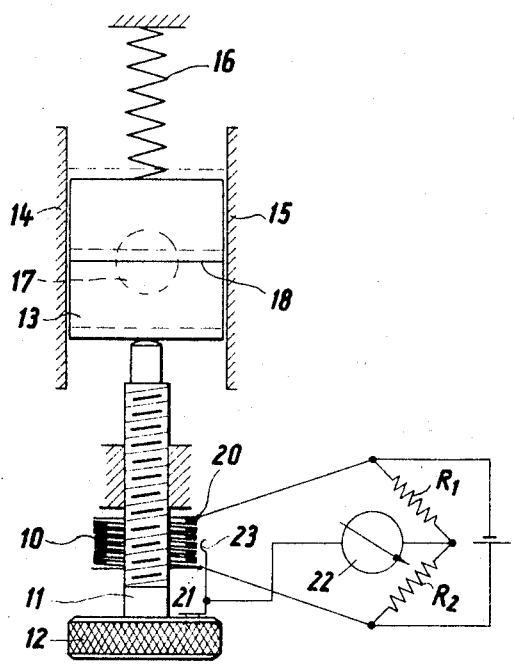
FIGURE 1 is an eyepiece screw micrometer with a ring potentiometer arranged centrically to the screw.
Figure 2:
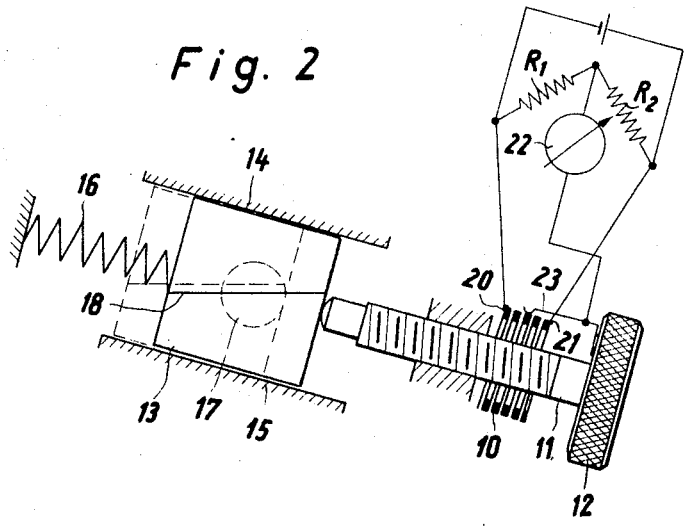
FIGURE 2 is a screw micrometer with a measuring plate movable in an oblique plane and with a ring potentiometer.

In the forms of embodiments in FIGURES 1 and 2 the ring potentiometer 10 is rigidly supported on a housing (not shown in the drawing), that is to say centrically to an adjusting screw 11, which is provided with a knurling 12 in known manner.

The screw or measuring spindle 11 acts on a measuring plate 13, which is slidingly supported between guides 14 and 15. The guiding is effected under the action of a counterspring 16. The field of view is shown at 17. The measuring plate can be provided in the usual way with measuring lines 18, a cross wire or the like. The actual measuring device is shown as a bridge circuit, which is connected to potentiometer terminals 20 and 21. The indicating device 22 is conductively connected with a slider 23, which in the forms of embodiments shown in in FIGURES 1 and 2 is rigidly connected to the micrometer screw 11. It can be seen from the wiring diagram that with a suitably calibrated electrical indicating instrument the variation in the voltage between the slider 23 and the corresponding potentiometer terminal the forward feed of the spindle 11 can be readably transmitted direct on the measuring instrument, in other words, the voltage is a measure of the displacement of the measuring line.

Figure 3:
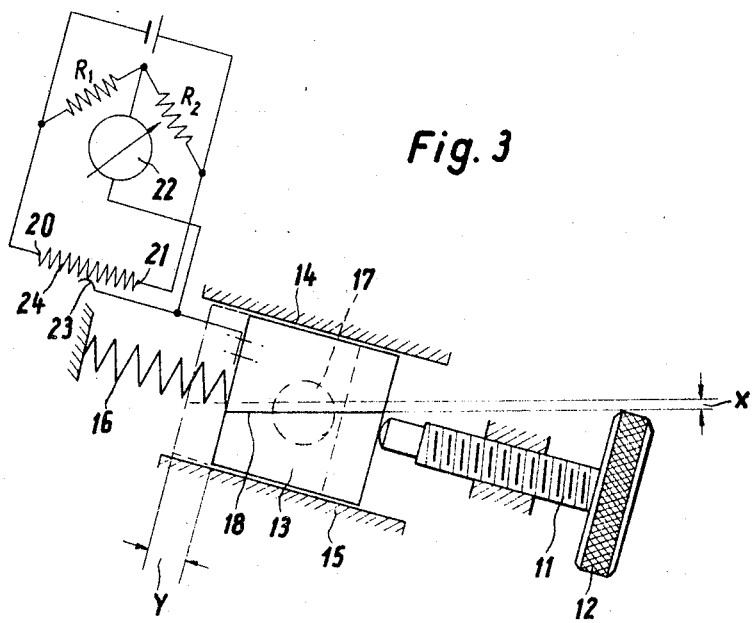
FIGURE 3 is an arrangement as in FIGURE 2, in which however a linear potentiometer is used.

In the forms of embodiment shown in FIGURES 2 and 3 a displacement of the measuring line 18 is effected by the displacement of the measuring plate between oblique planes 14 and 15. The measurement distance resulting from the displacement is designated in FIGURE 3 as "$x$." The path of displacement of the graduated dial is indicated by "$y$." Only the vertical displacement is measured in these embodiments, the angle of the guide surfaces 14, 15 is proportional to the development of the helical line on the screw spindle 11.

In FIGURE 2 the slider 23 is rigidly connected to the spindle 11, while in FIGURE 3 the arrangement is such that the slider 23 slides on the linear potentiometer 24. The slider 23 is rigidly connected with the measuring plate 13.

The fine measuring eye-piece (not shown in the drawing) can be supported in a known supporting device for instance on a tripod or the like. The dimensions of the optical system are adaptable to the required purpose. The fine measuring eye-piece is advantageously adjustable per se with the micrometer screw, and for example is also rotatably supported round the main axis.

Figure 4:
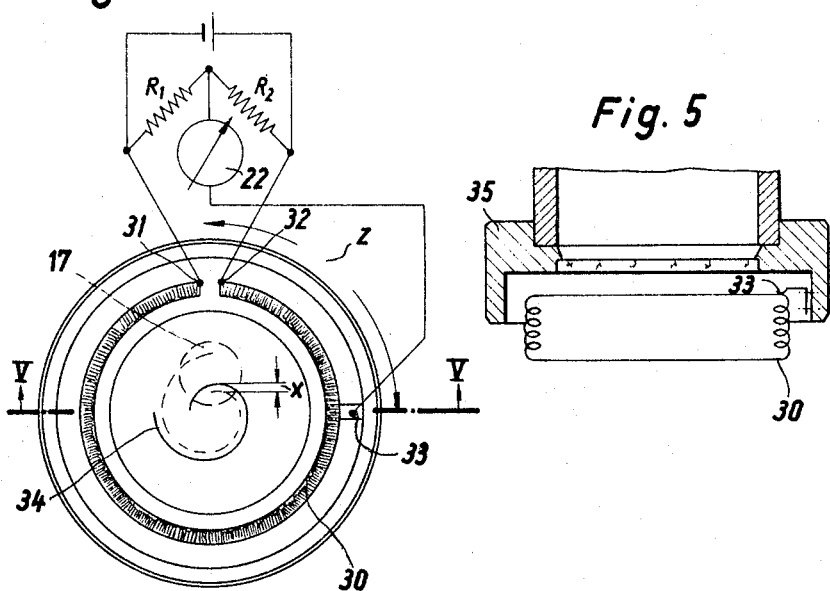
FIGURE 4 shows a coil micrometer, using a ring potentiometer.
Figure 5:
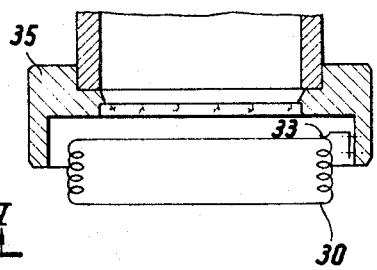
FIGURE 5 is a section along the line V—V in FIGURE 4.

FIGURES 4 and 5 show the construction of the subject matter of the invention in the case of a coil micrometer. Here a ring potentiometer 30 is used, to whose terminals 31 and 32 the measuring bridge is connected, the slider being designated 33. The ring potentiometer 30 is arranged centrically to the pivot of a measuring coil 34, which takes the form of a rotatable dial plate. The potentiometer 30 is stationary, and the slider 33 is connected to a rotatable ring 35. The voltage which can be read off on the indicating device is a measure of the pitch of the coils.

According to the invention the advantage is obtained that the actual, easily constructed measuring instrument can be made independent of the indicating device. The latter is separate and can be placed at any desired distance away, apart from a scale which can be read off the indicating device can also be equipped with signal devices for optical and acoustical signals or for other registering arrangements. Direct registering by registering scribers, photocells or the like is possible. A number of indicating devices can be combined in a supervising central station.

By guiding the measuring plate over an oblique plane, reductions can be obtained which would not otherwise be possible with screw spindles or the like.

The accuracy of the stepwise rotation of an axis through an angle $\alpha$ can be determined by means of a polygon and an autocollimation telescope. This is directed towards the polygon in such a way that the surface normals of the polygon have the same angle which corresponds to the angle of rotation. If the angle of rotation is then equal to the angle of the surface normals of the polygon then the autocollimation image aways appears at the same place in the field of view. If the angle of rotation and the angles of the surface normals are different, then the autocollimation image always has a different place in the field of view according to the amount and the algebraic prefix of the angular difference. The indicating device can also be calibrated in angular values.

What I claim is:

1. In an optical instrument, a measuring plate carrying thereon a measuring line extending across the plate, guides mounting said plate for sliding movement at an acute angle to said line, a screw to move said plate along said guides, a potentiometer comprising relatively movable resistance and contact elements, one of said elements being connected to said screw to move relatively to the other element to adjust said potentiometer, and an indicating instrument responsive to current through said potentiometer to indicate the movement of said screw and plate.

2. In an optical instrument, a measuring plate carrying thereon a measuring line extending across the plate, guides mounting said plate for sliding movement at an acute angle to said line, a screw to move said plate along said guides, a potentiometer comprising relatively movable resistance and contact elements, one of said elements being connected to said plate to move relatively to the other element to adjust said potentiometer, and an indicating instrument responsive to current through said potentiometer to indicate the movement of said screw and plate.

References Cited by the Examiner

UNITED STATES PATENTS

| | | | |
|---|---|---|---|
| 531,705 | 1/1895 | Wadsworth | 33—64 |
| 1,566,278 | 12/1925 | Kellner | 33—162 X |
| 1,860,827 | 5/1932 | Turnbull | 340—282 |
| 2,353,886 | 7/1944 | Findley et al. | 33—162 |
| 2,406,807 | 9/1946 | Colbath | 33—64 |
| 2,592,339 | 4/1952 | Rollat. | |
| 2,620,256 | 12/1952 | Kerns et al. | |
| 2,621,275 | 12/1952 | Nielsen et al. | 33—1 |
| 2,627,178 | 2/1953 | Hayward et al. | 73—313 X |
| 2,734,269 | 2/1956 | Claret | 33—1 |
| 2,999,415 | 9/1961 | Malinowski et al. | |

FOREIGN PATENTS 677,960    12/1929    France.

LEONARD FORMAN, *Primary Examiner.*

ISAAC LISANN, WILLIAM D. MARTIN, Jr.
*Assistant Examiners.*